US012749680B2

(12) United States Patent
Ma et al.

(10) Patent No.: US 12,749,680 B2
(45) Date of Patent: Sep. 29, 2026

(54) CATHODE ACTIVE MATERIAL, CATHODE AND LITHIUM SECONDARY BATTERY COMPRISING SAME, AND PREPARATION METHOD THEREFOR

(71) Applicant: Samsung Electronics Co., Ltd., Suwon-si (KR)

(72) Inventors: Sangbok Ma, Suwon-si (KR); Joonhee Kim, Suwon-si (KR); Sungjin Lim, Suwon-si (KR); Valentina Lacivita, Mountain View, CA (US); Yongwoo Shin, Mountain View, CA (US); Taeyoung Kim, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 661 days.

(21) Appl. No.: 18/252,649

(22) PCT Filed: Sep. 29, 2021

(86) PCT No.: PCT/KR2021/013373
§ 371 (c)(1),
(2) Date: May 11, 2023

(87) PCT Pub. No.: WO2022/102961
PCT Pub. Date: May 19, 2022

(65) Prior Publication Data

US 2024/0006605 A1 Jan. 4, 2024

Related U.S. Application Data

(60) Provisional application No. 63/112,250, filed on Nov. 11, 2020.

(30) Foreign Application Priority Data

Feb. 9, 2021 (KR) ........................ 10-2021-0018528

(51) Int. Cl.
*H01M 4/525* (2010.01)
*C01B 25/168* (2006.01)
(Continued)

(52) U.S. Cl.
CPC ........... *H01M 4/525* (2013.01); *C01B 25/168* (2013.01); *H01M 4/1315* (2013.01);
(Continued)

(58) Field of Classification Search
CPC ............... H01M 4/525; H01M 4/1315; H01M 10/0525; H01M 4/5825; H01M 4/36;
(Continued)

(56) References Cited

U.S. PATENT DOCUMENTS 7,008,566 B2 3/2006 Barker et al.
9,112,241 B2 8/2015 Yamada et al.
(Continued)

FOREIGN PATENT DOCUMENTS

CN 1780788 A 5/2006
CN 102803134 A 11/2012
(Continued)

OTHER PUBLICATIONS

Kundu et al., Synthesis, Structure, and Na-Ion Migration in Na4NiP2O7F2: A Prospective High Voltage Positive Electrode Material for the Na-Ion Battery, Published Jan. 5, 2015 in Chemistry of Materials, pp. 885-891 (Year: 2015).*
(Continued)

*Primary Examiner* — Stewart A Fraser
(74) *Attorney, Agent, or Firm* — CANTOR COLBURN LLP

(57) ABSTRACT

A cathode active material represented by Formula 1 below:

$$A_{2+x}MP_2O_7Z_y \quad \text{Formula 1}$$

wherein in Formula 1, A is at least one element selected from Group 1 of the Periodic Table, M is at least one metal
(Continued)

element selected from Groups 2 to 4, or 6 to 16 of the Periodic Table, and is a cation having a valence of at least two, Z is at least one element selected from Group 17 of the Periodic Table, $0<x\leq 4$, and $0<y\leq 4$.

21 Claims, 4 Drawing Sheets

(51) Int. Cl.
*H01M 4/02* (2006.01)
*H01M 4/1315* (2010.01)
*H01M 10/0525* (2010.01)

(52) U.S. Cl.
CPC ..... *H01M 10/0525* (2013.01); *C01P 2002/72* (2013.01); *C01P 2002/76* (2013.01); *C01P 2006/40* (2013.01); *H01M 2004/028* (2013.01)

(58) Field of Classification Search
CPC ........ H01M 4/58; H01M 4/62; H01M 10/052; C01B 25/168; C01B 25/45
See application file for complete search history.

(56) References Cited

U.S. PATENT DOCUMENTS

| | | | |
|---|---|---|---|
| 2012/0235082 A1 | 9/2012 | Yamada et al. | |
| 2015/0030929 A1 | 1/2015 | Barker | |
| 2015/0118561 A1* | 4/2015 | Gauthier | C01B 25/461 423/306 |
| 2019/0123354 A1 | 4/2019 | Kurita et al. | |
| 2019/0140265 A1* | 5/2019 | Miara | C01B 25/45 |
| 2020/0014011 A1 | 1/2020 | Wollfarth et al. | |

FOREIGN PATENT DOCUMENTS

| | | | |
|---|---|---|---|
| CN | 104380506 | A | 2/2015 |
| CN | 106629648 | A | 5/2017 |
| CN | 109980186 | A | 7/2019 |
| CN | 110137492 | A | 8/2019 |
| CN | 110352517 | A | 10/2019 |
| JP | 5682040 | B2 | 1/2015 |
| JP | 5830540 | B2 | 10/2015 |
| JP | 2017022069 | A | 1/2017 |
| JP | 6372972 | B2 | 7/2018 |
| JP | 6566137 | B2 | 8/2019 |
| JP | 2020119758 | A | 8/2020 |
| KR | 20140072881 | A | 6/2014 |
| KR | 20170062069 | A | 6/2017 |
| WO | 2013035222 | A1 | 3/2013 |
| WO | 2015023017 | A1 | 2/2015 |
| WO | 2020031690 | A1 | 2/2020 |

OTHER PUBLICATIONS

International Search Report for PCT/KR2021/013373 dated Dec. 31, 2021.

Office Action issued Apr. 16, 2026, in corresponding CN Patent Application No. 202180076120.8, with English Translation, 26 pages combined.

* cited by examiner

CATHODE ACTIVE MATERIAL, CATHODE AND LITHIUM SECONDARY BATTERY COMPRISING SAME, AND PREPARATION METHOD THEREFOR

CROSS-REFERENCE TO RELATED APPLICATION

This application is based on and claims priority to International Application No. PCT/KR2021/013373 filed on Sep. 29, 2021, Korean Patent Application No. 10-2021-0018528 filed on Feb. 9, 2021, in the Korean Intellectual Property Office, and U.S. Provisional Patent Application No. 63/112,250 filed on Nov. 11, 2020, and all the benefits accruing therefrom under 35 U.S.C. § 119, the contents of each of which are incorporated by reference herein in their entirety.

TECHNICAL FIELD

The present disclosure relates to a cathode, a lithium battery, and a preparation method therefor.

BACKGROUND

In accordance with the emergence of various miniaturized, high-performance electronic devices, in the field of lithium batteries, high energy density is becoming more important, in addition to miniaturization and weight reduction, in the field of lithium batteries. That is, high-capacity lithium batteries are becoming important.

Cathode active materials with high capacity have been investigated in order to implement a lithium battery suitable for the above use.

An olivine-based cathode active material has high capacity but the charge/discharge voltage is low.

Therefore, a cathode active material having high capacity and an increased driving voltage is desired.

SUMMARY

An aspect is to provide a novel cathode active material that provides increased capacity density and has an increased average discharge voltage.

Another aspect is to provide a cathode including the cathode active material.

Still another aspect is to provide a lithium battery employing the cathode.

Still another aspect is to provide a preparation method of the cathode active material.

According to an aspect, provided is a cathode active material represented by Formula 1 below:

$$A_{2+x}MP_2O_7Z_y, \quad \text{Formula 1}$$

wherein in Formula 1,

A is at least one element selected from Group 1 of the Periodic Table,

M is at least one metal element selected from Groups 2 to 4, and 6 to 16 of the Periodic Table, and is a cation having a valence of at least two, Z is at least one element selected from Group 17 of the Periodic Table, $0<x\leq4$, and $0<y\leq4$.

According to another aspect, provided is a cathode including the cathode active material.

According to still another aspect, provided is a lithium battery, including:

a cathode according to the above aspect; an anode; and an electrolyte arranged between the cathode and the anode.

According to still another aspect, provided is a method of preparing the cathode active material, including:

preparing a first composition by mixing an element A precursor, an element Z precursor, element M precursor, and a phosphorus precursor in a stoichiometric ratio to obtain a composition of Formula 1 below; and heat-treating the first composition in an oxidizing or an inert atmosphere at 400° C. to 1,000° C. for 3 hours to 20 hours, $$A_{2+x}MP_2O_7Z_y, \quad \text{Formula 1}$$

wherein in Formula 1,

A is at least one element selected from Group 1 of the Periodic Table,

M is at least one metal element selected from Groups 2 to 4, or 6 to 16 of the Periodic Table, and is a cation having a valence of at least two, Z is at least one element selected from Group 17 of the Periodic Table, $0<x\leq4$, and $0<y\leq4$.

According to an aspect, a discharge capacity density of a lithium battery is improved by using a cathode active material of a new composition including excess lithium.

EXPLANATION OF REFERENCE NUMERALS DESIGNATING MAJOR ELEMENTS OF THE DRAWINGS

Figure 1:
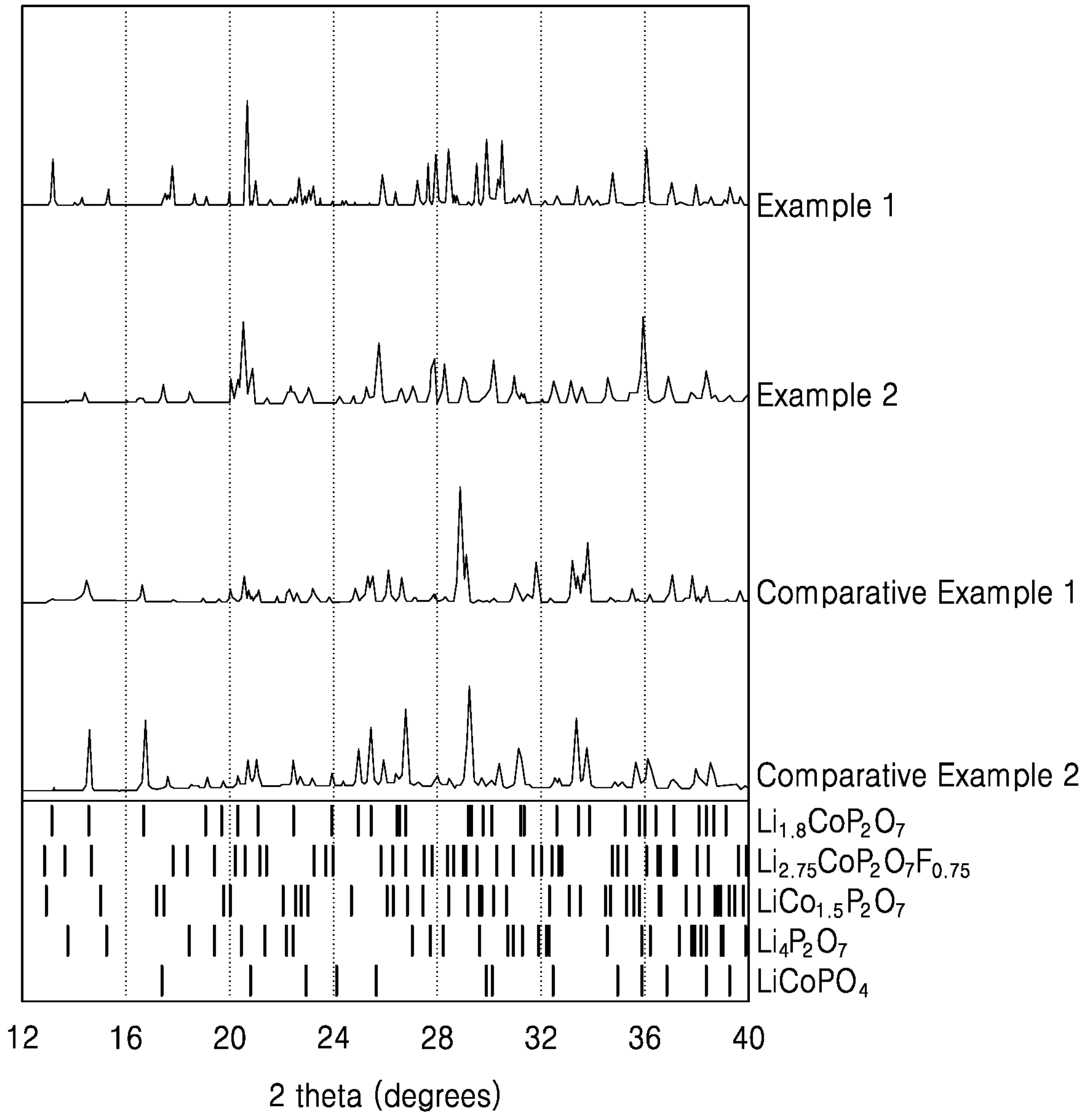
FIG. 1 shows X-ray diffraction (XRD) spectra of cathode active materials prepared in Examples 1 and 2, and Comparative Examples 1 and 2.

1 Lithium battery; 2 Anode;
3 Cathode; 4 Separator;
5 Battery case; 6 Cap assembly

DETAILED DESCRIPTION

The present inventive concept described hereinafter may be modified in various ways, and may have many examples, and thus, certain examples are illustrated in the drawings, and are described in detail in the specification. However, this does not intend to limit the present inventive concept within particular embodiments, and it should be understood that the present disclosure includes all the modifications, equivalents, and replacements within the technical scope of the present inventive concept.

Terms used herein were used to describe particular examples, and not to limit the present inventive concept. As used herein, the singular of any term includes the plural, unless the context otherwise requires. The expression of "include" or "have", used herein, indicates an existence of a characteristic, a number, a phase, a movement, an element, a component, a material, or a combination thereof, and it should not be construed to exclude in advance an existence or possibility of existence of at least one of other characteristics, numbers, movements, elements, components, materials, or combinations thereof. As used herein, "/" may be interpreted to mean "and" or "or" depending on the context.

In the drawings, a thickness is enlarged or reduced to clearly represent various layers and regions. The same reference numerals were attached to similar portions throughout the disclosure. As used herein throughout the disclosure, when a layer, a membrane, a region, or a plate is described to be "on" or "above" something else, it not only includes the case in which it is right above something else but also the case when other portion(s) are present in-between. Terms like "first", "second", and the like may be used to describe various components, but the components are not limited by the terms. The terms are used merely for the purpose of distinguishing one component from other components.

In the present specification, a "particle diameter" of particles indicates an average diameter when the particles are spherical, and an average length of the long axis when the particles are non-spherical. Particle diameters of particles may be measured by using a particle size analyzer (PSA). A "particle diameter" of particles is, for example, an "average particle diameter". An average particle diameter is, for example, a median particle diameter (D50). The median particle diameter (D50) is, for example, a particle diameter corresponding to a 50% cumulative volume calculated from particles having small particle diameters in a particle diameter distribution, measured by a laser diffraction method.

Hereinafter, a cathode active material, a cathode including the same, a lithium battery including the cathode, and a method of preparing the cathode active material according to example embodiments will be described in more detail.

A cathode active material according to an embodiment is represented by Formula 1:

$$A_{2+x}MP_2O_7Z_y, \quad \text{Formula 1}$$

wherein in the formula,

A is at least one element selected from Group 1 of the Periodic Table,

M is at least one metal element selected from Groups 2 to 4, or 6 to 16 of the Periodic Table, and is a cation having a valence of at least two, Z is at least one element selected from Group 17 of the Periodic Table, $0<x\leq4$, and $0<y\leq4$.

For example, $0<x\leq3.5$ and $0<y\leq3.5$; $0<x\leq3$ and $0<y\leq3$; $0<x\leq2.5$ and $0<y\leq2.5$; $0<x\leq2$ and $0<y\leq2$; $0.1\leq x\leq2$ and $0.1\leq y\leq2$; $0.5\leq x\leq2$ and $0.5\leq y\leq2$; $0.75\leq x\leq2$ and $0.75\leq y\leq2$; or $1\leq x\leq2$ and $1\leq y\leq2$. M is, for example, a cation having a valence of 2 to 5, a cation having a valence of 2 to 4, a cation having a valence of 2 to 3, a cation having a valence of 2 to 2.5, or a divalent cation.

Structural relaxation occurs when the cathode active material includes a high content of Periodic Table Group 1 elements and Periodic Table Group 17 elements, and due to this structural relaxation, enhanced discharge capacity and a high discharge voltage are provided at the same time.

The cathode active material represented by Formula 1 may provide enhanced discharge capacity when additional lithium is arranged in a crystal structure compared to a composition in which x=0, and y=0, due to a reduction of barriers to lithium ions in the crystal structure, for example, as a lithium content increases in a lithium layer arranged between metal layers of the crystal structure.

In Formula 1, A may be, for example, at least one selected from Li, Na, or K. A may be, for example, Li.

In Formula 1, M may be, for example, at least one selected from Mg, Ca, Sr, Ba, Sc, Y, Ti, Zr, Hf, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, or Bi. M may be, for example, at least one selected from Co, Ni. Mn, Fe, Cu, Zn, Ti, or Cr.

In Formula 1, Z may be, for example, at least one selected from F, Cl, Br, or I.

A cathode active material may be, for example, represented by Formula 2 below:

$$Li_{2+a}MP_2O_7Z_b, \quad \text{Formula 2}$$

wherein in the formula,

M is at least one metal element selected from Groups 2 to 4, or 6 to 16 of the Periodic Table, and is a cation having a valence of at least two, Z is at least one element selected from Group 17 of the Periodic Table, $0<a\leq2$, and $0<b\leq2$. For example, $0.01\leq a\leq2$ and $0.01\leq b\leq2$; $0.05\leq a\leq2$ and $0.05\leq b\leq2$; $0.1\leq a\leq2$ and $0.1\leq b\leq2$; $0.25\leq a\leq2$ and $0.25\leq b\leq2$; $0.5\leq a\leq2$ and $0.5\leq b\leq2$; $0.75\leq a\leq2$ and $0.75\leq b\leq2$; or $1\leq a\leq2$ and $1\leq b\leq2$. M is, for example, a cation having a valence of 2 to 5, a cation having a valence of 2 to 4, a cation having a valence of 2 to 3, a cation having a valence of 2 to 2.5, or a divalent cation.

The cathode active material may be, for example, represented by Formulas 3a to 3h below:

$$Li_{2+c}CoP_2O_7Z_d \quad \text{Formula 3a}$$

$$Li_{2+c}NiP_2O_7Z_d \quad \text{Formula 3b}$$

$$Li_{2+c}MnP_2O_7Z_d \quad \text{Formula 3c}$$

$$Li_{2+c}FeP_2O_7Z_d \quad \text{Formula 3d}$$

$$Li_{2+c}CuP_2O_7Z_d \quad \text{Formula 3e}$$

$$Li_{2+c}ZnP_2O_7Z_d \quad \text{Formula 3f}$$

$$Li_{2+c}TiP_2O_7Z_d \quad \text{Formula 3g}$$

$$Li_{2+c}CrP_2O_7Z_d \quad \text{Formula 3h}$$

wherein in each of Formulas 3a to 3h,

Z is independently at least one element selected from Group 17 of the Periodic Table, c is independently $0.01\leq c\leq2$, and d is independently $0.01\leq d\leq2$. For example, $0.03\leq c\leq2$ and $0.03\leq d\leq2$; $0.05\leq c\leq2$ and $0.05\leq d\leq2$; $0.1\leq c\leq2$ and $0.1\leq d\leq2$; $0.25\leq c\leq2$ and $0.25\leq d\leq2$; $0.5\leq c\leq2$ and $0.5\leq d\leq2$; $0.75\leq c\leq2$ and $0.75\leq d\leq2$; or $1\leq c\leq2$ and $1\leq d\leq2$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

The cathode active material may be, for example, represented by Formulas 4a to 4d below:

$$Li_{2+e}MP_2O_7F_f \quad \text{Formula 4a}$$

$$Li_{2+e}MP_2O_7Cl_f \quad \text{Formula 4b}$$

$$Li_{2+e}MP_2O_7Br_f \quad \text{Formula 4c}$$

$$Li_{2+e}MP_2O_7I_f \quad \text{Formula 4d}$$

wherein in each of Formulas 4a to 4d,

- M is independently at least one metal element selected from Mg, Ca, Sr, Ba, Sc, Y, Ti, Zr, Hf, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, Se, Te, or Po, and is a cation having a valence of at least two,
- e is independently $0.05 \le e \le 2$, and f is independently $0.05 \le f \le 2$. For example, $0.07 \le e \le 2$ and $0.07 \le f \le 2$; $0.09 \le e \le 2$ and $0.09 \le f \le 2$; $0.1 \le e \le 2$ and $0.1 \le f \le 2$; $0.5 \le e \le 2$ and $0.5 \le f \le 2$; $0.75 \le e \le 2$ and $0.75 \le f \le 2$; or $1 \le e \le 2$ and $1 \le f \le 2$. For example, M may be each independently, a cation having a valence of 2 to 5, a cation having a valence of 2 to 4, a cation having a valence of 2 to 3, a cation having a valence of 2 to 2.5, or a divalent cation.

The cathode active material may be, for example, represented by Formulas 5a to 5h below:

$Li_{2+e}CoP_2O_7F_f$ Formula 5a $Li_{2+e}NiP_2O_7F_f$ Formula 5b $Li_{2+e}MnP_2O_7F_f$ Formula 5c $Li_{2+e}FeP_2O_7F_f$ Formula 5d $Li_{2+e}CuP_2O_7F_f$ Formula 5e $Li_{2+e}ZnP_2O_7F_f$ Formula 5f $Li_{2+e}TiP_2O_7F_f$ Formula 5g $Li_{2+e}CrP_2O_7F_f$ Formula 5h wherein in each of Formulas 5a to 5h, e is independently $0.05 \le e \le 2$, and f is independently $0.05 \le f \le 2$. For example, $0.07 \le e \le 2$ and $0.07 \le f \le 2$; $0.09 \le e \le 2$ and $0.09 \le f \le 2$; $0.1 \le e \le 2$ and $0.1 \le f \le 2$; $0.5 \le e \le 2$ and $0.5 \le f \le 2$; $0.75 \le e \le 2$ and $0.75 \le f \le 2$; or $1 \le e \le 2$ and $1 \le f \le 2$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

The cathode active material may be, for example, represented by the formulas below:

$Li_{2.05}CoP_2O_7F_{0.05}$, $Li_{2.10}CoP_2O_7F_{0.10}$, $Li_{2.15}CoP_2O_7F_{0.15}$, $Li_{2.20}CoP_2O_7F_{0.20}$, $Li_{2.25}CoP_2O_7F_{0.25}$, $Li_{2.30}CoP_2O_7F_{0.30}$, $Li_{2.35}CoP_2O_7F_{0.35}$, $Li_{2.40}CoP_2O_7F_{0.40}$, $Li_{2.45}CoP_2O_7F_{0.45}$, $Li_{2.50}CoP_2O_7F_{0.5}$, $Li_{2.55}CoP_2O_7F_{0.55}$, $Li_{2.60}CoP_2O_7F_{0.60}$, $Li_{2.65}CoP_2O_7F_{0.65}$, $Li_{2.70}CoP_2O_7F_{0.70}$, $Li_{2.75}CoP_2O_7F_{0.75}$, $Li_{2.80}CoP_2O_7F_{0.80}$, $Li_{2.85}CoP_2O_7F_{0.85}$, $Li_{2.90}CoP_2O_7F_{0.90}$, $Li_{3.0}CoP_2O_7F_{1.0}$, $Li_{3.25}CoP_2O_7F_{1.25}$, $Li_{3.5}CoP_2O_7F_{1.5}$, $Li_{3.75}CoP_2O_7F_{1.75}$, $Li_4CoP_2O_7F_{2.0}$, $Li_{2.05}NiP_2O_7F_{0.05}$, $Li_{2.10}NiP_2O_7F_{0.10}$, $Li_{2.15}NiP_2O_7F_{0.15}$, $Li_{2.20}NiP_2O_7F_{0.20}$, $Li_{2.25}NiP_2O_7F_{0.25}$, $Li_{2.30}NiP_2O_7F_{0.30}$, $Li_{2.35}NiP_2O_7F_{0.35}$, $Li_{2.4}NiP_2O_7F_{0.40}$, $Li_{2.45}NiP_2O_7F_{0.45}$, $Li_{2.50}NiP_2O_7F_{0.5}$, $Li_{2.55}NiP_2O_7F_{0.55}$, $Li_{2.60}NiP_2O_7F_{0.60}$, $Li_{2.65}NiP_2O_7F_{0.65}$, $Li_{2.70}NiP_2O_7F_{0.70}$, $Li_{2.75}NiP_2O_7F_{0.75}$, $Li_{2.80}NiP_2O_7F_{0.80}$, $Li_{2.85}NiP_2O_7F_{0.85}$, $Li_{2.90}NiP_2O_7F_{0.90}$, $Li_{3.0}NiP_2O_7F_{1.0}$, $Li_{3.25}NiP_2O_7F_{1.25}$, $Li_{3.5}NiP_2O_7F_{1.5}$, $Li_{3.75}NiP_2O_7F_{1.75}$, $Li_4NiP_2O_7F_{2.0}$, $Li_{2.05}MnP_2O_7F_{0.05}$, $Li_{2.10}MnP_2O_7F_{0.10}$, $Li_{2.15}MnP_2O_7F_{0.15}$, $Li_{2.20}MnP_2O_7F_{0.20}$, $Li_{2.25}MnP_2O_7F_{0.25}$, $Li_{2.30}MnP_2O_7F_{0.30}$, $Li_{2.35}MnP_2O_7F_{0.35}$, $Li_{2.40}MnP_2O_7F_{0.40}$, $Li_{2.45}MnP_2O_7F_{0.45}$, $Li_{2.50}MnP_2O_7F_{0.5}$, $Li_{2.55}MnP_2O_7F_{0.55}$, $Li_{2.60}MnP_2O_7F_{0.60}$, $Li_{2.65}MnP_2O_7F_{0.65}$, $Li_{2.70}MnP_2O_7F_{0.70}$, $Li_{2.75}MnP_2O_7F_{0.75}$, $Li_{2.80}MnP_2O_7F_{0.80}$, $Li_{2.85}MnP_2O_7F_{0.85}$, $Li_{2.90}MnP_2O_7F_{0.90}$, $Li_{3.0}MnP_2O_7F_{1.0}$, $Li_{3.25}MnP_2O_7F_{1.25}$, $Li_{3.5}MnP_2O_7F_{1.5}$, $Li_{3.75}MnP_2O_7F_{1.75}$, $Li_4MnP_2O_7F_{2.0}$, $Li_{2.05}FeP_2O_7F_{0.05}$, $Li_{2.10}FeP_2O_7F_{0.10}$, $Li_{2.15}FeP_2O_7F_{0.15}$, $Li_{2.20}FeP_2O_7F_{0.20}$, $Li_{2.25}FeP_2O_7F_{0.25}$, $Li_{2.30}FeP_2O_7F_{0.30}$, $Li_{2.35}FeP_2O_7F_{0.35}$, $Li_{2.40}FeP_2O_7F_{0.40}$, $Li_{2.45}FeP_2O_7F_{0.45}$, $Li_{2.50}FeP_2O_7F_{0.5}$, $Li_{2.55}FeP_2O_7F_{0.55}$, $Li_{2.60}FeP_2O_7F_{0.60}$, $Li_{2.65}FeP_2O_7F_{0.65}$, $Li_{2.70}FeP_2O_7F_{0.70}$, $Li_{2.75}FeP_2O_7F_{0.75}$, $Li_{2.80}FeP_2O_7F_{0.80}$, $Li_{2.85}FeP_2O_7F_{0.85}$, $Li_{2.90}FeP_2O_7F_{0.90}$, $Li_{3.0}FeP_2O_7F_{1.0}$, $Li_{3.25}FeP_2O_7F_{1.25}$, $Li_{3.5}FeP_2O_7F_{1.5}$, $Li_{3.75}FeP_2O_7F_{1.75}$, $Li_4FeP_2O_7F_{2.0}$, $Li_{2.05}CuP_2O_7F_{0.05}$, $Li_{2.10}CuP_2O_7F_{0.10}$, $Li_{2.15}CuP_2O_7F_{0.15}$, $Li_{2.20}CuP_2O_7F_{0.20}$, $Li_{2.25}CuP_2O_7F_{0.25}$, $Li_{2.30}CuP_2O_7F_{0.30}$, $Li_{2.35}CuP_2O_7F_{0.35}$, $Li_{2.40}CuP_2O_7F_{0.40}$, $Li_{2.45}CuP_2O_7F_{0.45}$, $Li_{2.50}CuP_2O_7F_{0.5}$, $Li_{2.55}CuP_2O_7F_{0.55}$, $Li_{2.60}CuP_2O_7F_{0.60}$, $Li_{2.65}CuP_2O_7F_{0.65}$, $Li_{2.70}CuP_2O_7F_{0.70}$, $Li_{2.75}CuP_2O_7F_{0.75}$, $Li_{2.80}CuP_2O_7F_{0.80}$, $Li_{2.85}CuP_2O_7F_{0.85}$, $Li_{2.90}CuP_2O_7F_{0.90}$, $Li_{3.0}CuP_2O_7F_{1.0}$, $Li_{3.25}CuP_2O_7F_{1.25}$, $Li_{3.5}CuP_2O_7F_{1.5}$, $Li_{3.75}CuP_2O_7F_{1.75}$, $Li_4CuP_2O_7F_{2.0}$, $Li_{2.05}ZnP_2O_7F_{0.05}$, $Li_{2.10}ZnP_2O_7F_{0.10}$, $Li_{2.15}ZnP_2O_7F_{0.15}$, $Li_{2.20}ZnP_2O_7F_{0.20}$, $Li_{2.25}ZnP_2O_7F_{0.25}$, $Li_{2.30}ZnP_2O_7F_{0.30}$, $Li_{2.35}ZnP_2O_7F_{0.35}$, $Li_{2.40}ZnP_2O_7F_{0.40}$, $Li_{2.45}ZnP_2O_7F_{0.45}$, $Li_{2.50}ZnP_2O_7F_{0.5}$, $Li_{2.55}ZnP_2O_7F_{0.55}$, $Li_{2.60}ZnP_2O_7F_{0.60}$, $Li_{2.65}ZnP_2O_7F_{0.65}$, $Li_{2.70}ZnP_2O_7F_{0.70}$, $Li_{2.75}ZnP_2O_7F_{0.75}$, $Li_{2.80}ZnP_2O_7F_{0.80}$, $Li_{2.85}ZnP_2O_7F_{0.85}$, $Li_{2.90}ZnP_2O_7F_{0.90}$, $Li_{3.0}ZnP_2O_7F_{1.0}$, $Li_{3.25}ZnP_2O_7F_{1.25}$, $Li_{3.5}ZnP_2O_7F_{1.5}$, $Li_{3.75}ZnP_2O_7F_{1.75}$, $Li_4ZnP_2O_7F_{2.0}$, $Li_{2.05}TiP_2O_7F_{0.05}$, $Li_{2.10}TiP_2O_7F_{0.10}$, $Li_{2.15}TiP_2O_7F_{0.15}$, $Li_{2.20}TiP_2O_7F_{0.20}$, $Li_{2.25}TiP_2O_7F_{0.25}$, $Li_{2.30}TiP_2O_7F_{0.30}$, $Li_{2.35}TiP_2O_7F_{0.35}$, $Li_{2.40}TiP_2O_7F_{0.40}$, $Li_{2.45}TiP_2O_7F_{0.45}$, $Li_{2.50}TiP_2O_7F_{0.5}$, $Li_{2.55}TiP_2O_7F_{0.55}$, $Li_{2.60}TiP_2O_7F_{0.60}$, $Li_{2.65}TiP_2O_7F_{0.65}$, $Li_{2.70}TiP_2O_7F_{0.70}$, $Li_{2.75}TiP_2O_7F_{0.75}$, $Li_{2.80}TiP_2O_7F_{0.80}$, $Li_{2.85}TiP_2O_7F_{0.85}$, $Li_{2.90}TiP_2O_7F_{0.90}$, $Li_{3.0}TiP_2O_7F_{1.0}$, $Li_{3.25}TiP_2O_7F_{1.25}$, $Li_{3.5}TiP_2O_7F_{1.5}$, $Li_{3.75}TiP_2O_7F_{1.75}$, $Li_4TiP_2O_7F_{2.0}$, $Li_{2.05}CrP_2O_7F_{0.05}$, $Li_{2.10}CrP_2O_7F_{0.10}$, $Li_{2.15}CrP_2O_7F_{0.15}$, $Li_{2.20}CrP_2O_7F_{0.20}$, $Li_{2.25}CrP_2O_7F_{0.25}$, $Li_{2.30}CrP_2O_7F_{0.30}$, $Li_{2.35}CrP_2O_7F_{0.35}$, $Li_{2.40}CrP_2O_7F_{0.40}$, $Li_{2.45}CrP_2O_7F_{0.45}$, $Li_{2.50}CrP_2O_7F_{0.5}$, $Li_{2.55}CrP_2O_7F_{0.55}$, $Li_{2.60}CrP_2O_7F_{0.60}$, $Li_{2.65}CrP_2O_7F_{0.65}$, $Li_{2.70}CrP_2O_7F_{0.70}$, $Li_{2.75}CrP_2O_7F_{0.75}$, $Li_{2.80}CrP_2O_7F_{0.80}$, $Li_{2.85}CrP_2O_7F_{0.85}$, $Li_{2.90}CrP_2O_7F_{0.90}$, $Li_{3.0}CrP_2O_7F_{1.0}$, $Li_{3.25}CrP_2O_7F_{1.25}$, $Li_{3.5}CrP_2O_7F_{1.5}$, $Li_{3.75}CrP_2O_7F_{1.75}$, and $Li_4CrP_2O_7F_{2.0}$.

The cathode active material may be, for example, represented by Formula 6 below:

$Li_{2+x}(M1_{1-z}M2_z)P_2O_7(Z1_{1-w}Z2_w)_y$, Formula 6 wherein in Formula 6,

- M1 and M2 are each independently a metal element selected from Co, Ni, Mn, Fe, Cu, Zn, Ti, or Cr, and M1 and M2 are each independently a cation having a valence of at least two,
- Z1 and Z2 are each independently an element selected from Group 17 of the Periodic Table,
- $0<x \le 4$, $0<y \le 4$, $0 \le z<1$, and $0 \le w<1$.

For example, $0<x \le 3.5$, $0<y \le 3.5$, $0 \le z<1$ and $0 \le w<1$; $0<x \le 3$, $0<y \le 3$, $0 \le z<1$ and $0 \le w<1$; $0<x \le 2.5$, $0<y \le 2.5$, $0 \le z<1$ and $0 \le w<1$; $0<x \le 2$, $0<y \le 2$, $0 \le z<1$ and $0 \le w<1$; $0.1 \le x \le 2$, $0.1 \le y \le 2$, $0 \le z<1$ and $0 \le w<1$; $0.5 \le x \le 2$, $0.5 \le y \le 2$, $0 \le z<1$ and $0 \le w<1$; $0.75 \le x \le 2$, $0.75 \le y \le 2$, $0 \le z<1$ and $0 \le w<1$; or $1 \le x \le 2$, $1 \le y \le 2$, $0 \le z<1$, and $0 \le w<1$. For example, $0<x \le 3$, $0<y \le 3$, $0 \le z<0.1$, and $0 \le w<0.1$. For example, $0<x \le 2$, $0<y \le 2$, $0 \le z<0.05$, and $0 \le w<0.05$. For example, M1 and M2 may be each independently, a cation having a valence of 2 to 5, a cation having a valence of 2 to 4, a cation having a valence of 2 to 3, a cation having a valence of 2 to 2.5, or a divalent cation.

The cathode active material may be, for example, represented by Formulas 6a to 6h below.

$Li_{2+x}(Co_{1-z}M2_z)P_2O_7(F_{1-w}Z2_w)_y$ Formula 6a

In Formula 6a, M2 is a metal element selected from Ni, Mn, Fe, Cu, Zn, Ti, or Cr, and a cation having a valence of at least two, Z2 is Cl or Br, $0<x\leq 4$, $0<y\leq 4$, $0\leq z<1$, and $0\leq w<1$. For example, $0<x\leq 3.5$, $0<y\leq 3.5$, $0\leq z<1$ and $0\leq w<1$; $0<x\leq 3$, $0<y\leq 3$, $0\leq z<1$ and $0\leq w<1$; $0<x\leq 2.5$, $0<y\leq 2.5$, $0\leq z<1$ and $0\leq w<1$; $0<x\leq 2$, $0<y\leq 2$, $0\leq z<1$ and $0\leq w<1$; $0.1\leq x\leq 2$, $0.1\leq y\leq 2$, $0\leq z<1$ and $0\leq w<1$; $0.5\leq x\leq 2$, $0.5\leq y\leq 2$, $0\leq z<1$ and $0\leq w<1$; $0.75\leq x\leq 2$, $0.75\leq y\leq 2$, $0\leq z<1$ and $0\leq w<1$; or $1\leq x\leq 2$, $1<y\leq 2$, $0\leq z<1$ and $0\leq w<1$. For example, $0<x\leq 3$, $0<y\leq 3$, $0\leq z<0.1$, and $0\leq w<0.1$. For example, $0<x\leq 2$, $0<y\leq 2$, $0\leq z<0.05$, and $0\leq w<0.05$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

$$Li_{2+x}(Ni_{1-z}M2_z)P_2O_7(F_{1-w}Z2_w)_y \quad \text{Formula 6b}$$

In Formula 6b, M2 is a metal element selected from Co, Mn, Fe, Cu, Zn, Ti, or Cr, and a cation having a valence of at least two, Z2 is Cl or Br, $0<x\leq 4$, $0<y\leq 4$, $0\leq z<1$, and $0\leq w<1$. For example, $0<x\leq 3.5$, $0<y\leq 3.5$, $0\leq z<1$ and $0\leq w<1$; $0<x\leq 3$, $0<y\leq 3$, $0\leq z<1$ and $0\leq w<1$; $0<x\leq 2.5$, $0<y\leq 2.5$, $0\leq z<1$ and $0\leq w<1$; $0<x\leq 2$, $0<y\leq 2$, $0\leq z<1$ and $0\leq w<1$; $0.1\leq x\leq 2$, $0.1\leq y\leq 2$, $0\leq z<1$ and $0\leq w<1$; $0.5\leq x\leq 2$, $0.5\leq y\leq 2$, $0\leq z<1$ and $0\leq w<1$; $0.75\leq x\leq 2$, $0.75\leq y\leq 2$, $0\leq z<1$ and $0\leq w<1$; or $1\leq x\leq 2$, $1\leq y\leq 2$, $0\leq z<1$ and $0\leq w<1$. For example, $0<x\leq 3$, $0<y\leq 3$, $0\leq z<0.1$, and $0\leq w<0.1$. For example, $0<x\leq 2$, $0<y\leq 2$, $0\leq z<0.05$, and $0\leq w<0.05$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

$$Li_{2+x}(Mn_{1-z}M2_z)P_2O_7(F_{1-w}Z2_w)_y \quad \text{Formula 6c}$$

In Formula 6c, M2 is a metal element selected from Co, Ni, Fe, Cu, Zn, Ti, or Cr, and a cation having a valence of at least two, Z2 is Cl or Br, $0<x\leq 4$, $0<y\leq 4$, $0\leq z<1$, and $0\leq w<1$. For example, $0<x\leq 3.5$, $0<y\leq 3.5$, $0\leq z<1$ and $0\leq w<1$; $0<x\leq 3$, $0<y\leq 3$, $0\leq z<1$ and $0\leq w<1$; $0<x\leq 2.5$, $0<y\leq 2.5$, $0\leq z<1$ and $0\leq w<1$; $0<x\leq 2$, $0<y\leq 2$, $0\leq z<1$ and $0\leq w<1$; $0.1\leq x\leq 2$, $0.1\leq y\leq 2$, $0\leq z<1$ and $0\leq w<1$; $0.5\leq x\leq 2$, $0.5\leq y\leq 2$, $0\leq z<1$ and $0\leq w<1$; $0.75\leq x\leq 2$, $0.75\leq y\leq 2$, $0\leq z<1$ and $0\leq w<1$; or $1\leq x\leq 2$, $1\leq y\leq 2$, $0\leq z<1$ and $0\leq w<1$. For example, $0<x\leq 3$, $0<y\leq 3$, $0\leq z<0.1$, and $0\leq w<0.1$. For example, $0<x\leq 2$, $0<y\leq 2$, $0\leq z<0.05$, and $0\leq w<0.05$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

$$Li_{2+x}(Fe_{1-z}M2_z)P_2O_7(F_{1-w}Z2_w)_y \quad \text{Formula 6d}$$

In Formula 6d, M2 is a metal element selected from Co, Ni, Mn, Cu, Zn, Ti, or Cr, and a cation having a valence of at least two, Z2 is Cl or Br, $0<x\leq 4$, $0<y\leq 4$, $0\leq z<1$, and $0\leq w<1$. For example, $0<x\leq 3.5$, $0<y\leq 3.5$, $0\leq z<1$ and $0\leq w<1$; $0<x\leq 3$, $0<y\leq 3$, $0\leq z<1$ and $0\leq w<1$; $0<x\leq 2.5$, $0<y\leq 2.5$, $0\leq z<1$ and $0\leq w<1$; $0<x\leq 2$, $0<y\leq 2$, $0\leq z<1$ and $0\leq w<1$; $0.1\leq x\leq 2$, $0.1\leq y\leq 2$, $0\leq z<1$ and $0\leq w<1$; $0.5\leq x\leq 2$, $0.5\leq y\leq 2$, $0\leq z<1$ and $0\leq w<1$; $0.75\leq x\leq 2$, $0.75\leq y\leq 2$, $0\leq z<1$ and $0\leq w<1$; or $1\leq x\leq 2$, $1\leq y\leq 2$, $0\leq z<1$ and $0\leq w<1$. For example, $0<x\leq 3$, $0<y\leq 3$, $0\leq z<0.1$, and $0\leq w<0.1$. For example, $0<x\leq 2$, $0<y\leq 2$, $0\leq z<0.05$, and $0\leq w<0.05$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

$$Li_{2+x}(Cu_{1-z}M2_z)P_2O_7(F_{1-w}Z2_w)_y \quad \text{Formula 6e}$$

In Formula 6e, M2 is a metal element selected from Co, Ni, Mn, Fe, Zn, Ti, or Cr, and a cation having a valence of at least two, Z2 is Cl or Br, $0<x\leq 4$, $0<y\leq 4$, $0\leq z<1$, and $0\leq w<1$. For example, $0<x\leq 3.5$, $0<y\leq 3.5$, $0\leq z<1$ and $0\leq w<1$; $0<x\leq 3$, $0<y\leq 3$, $0\leq z<1$ and $0\leq w<1$; $0<x\leq 2.5$, $0<y\leq 2.5$, $0\leq z<1$ and $0\leq w<1$; $0<x\leq 2$, $0<y\leq 2$, $0\leq z<1$ and $0\leq w<1$; $0.1\leq x\leq 2$, $0.1\leq y\leq 2$, $0\leq z<1$ and $0\leq w<1$; $0.5\leq x\leq 2$, $0.5\leq y\leq 2$, $0\leq z<1$ and $0\leq w<1$; $0.75\leq x\leq 2$, $0.75\leq y\leq 2$, $0\leq z<1$ and $0\leq w<1$; or $1\leq x\leq 2$, $1\leq y\leq 2$, $0\leq z<1$ and $0\leq w<1$. For example, $0<x\leq 3$, $0<y\leq 3$, $0\leq z<0.1$, and $0\leq w<0.1$. For example, $0<x\leq 2$, $0<y\leq 2$, $0\leq z<0.05$, and $0\leq w<0.05$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

$$Li_{2+x}(Zn_{1-z}M2_z)P_2O_7(F_{1-w}Z2_w)_y \quad \text{Formula 6f}$$

In Formula 6f, M2 is a metal element selected from Co, Ni, Mn, Fe, Cu, Ti, or Cr, and a cation having a valence of at least two, Z2 is Cl or Br, $0<x\leq 4$, $0<y\leq 4$, $0\leq z<1$, and $0\leq w<1$. For example, $0<x\leq 3.5$, $0<y\leq 3.5$, $0\leq z<1$ and $0\leq w<1$; $0<x\leq 3$, $0<y\leq 3$, $0\leq z<1$ and $0\leq w<1$; $0<x\leq 2.5$, $0<y\leq 2.5$, $0\leq z<1$ and $0\leq w<1$; $0<x\leq 2$, $0<y\leq 2$, $0\leq z<1$ and $0\leq w<1$; $0.1\leq x\leq 2$, $0.1\leq y\leq 2$, $0\leq z<1$ and $0\leq w<1$; $0.5\leq x\leq 2$, $0.5\leq y\leq 2$, $0\leq z<1$ and $0\leq w<1$; $0.75\leq x\leq 2$, $0.75\leq y\leq 2$, $0\leq z<1$ and $0\leq w<1$; or $1\leq x\leq 2$, $1\leq y\leq 2$, $0\leq z<1$ and $0\leq w<1$. For example, $0<x\leq 3$, $0<y\leq 3$, $0\leq z<0.1$, and $0\leq w<0.1$. For example, $0<x\leq 2$, $0<y\leq 2$, $0\leq z<0.05$, and $0\leq w<0.05$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

$$Li_{2+x}(Ti_{1-z}M2_z)P_2O_7(F_{1-w}Z2_w)_y \quad \text{Formula 6g}$$

In Formula 6g, M2 is a metal element selected from Co, Ni, Mn, Fe, Cu, Zn, or Cr, and a cation having a valence of at least two, Z2 is Cl or Br, $0<x\leq 4$, $0<y\leq 4$, $0\leq z<1$, and $0\leq w<1$. For example, $0<x\leq 3.5$, $0<y\leq 3.5$, $0\leq z<1$ and $0\leq w<1$; $0<x\leq 3$, $0<y\leq 3$, $0\leq z<1$ and $0\leq w<1$; $0<x\leq 2.5$, $0<y\leq 2.5$, $0\leq z<1$ and $0\leq w<1$; $0<x\leq 2$, $0<y\leq 2$, $0\leq z<1$ and $0\leq w<1$; $0.1\leq x\leq 2$, $0.1\leq y\leq 2$, $0\leq z<1$ and $0\leq w<1$; $0.5\leq x\leq 2$, $0.5\leq y\leq 2$, $0\leq z<1$ and $0\leq w<1$; $0.75\leq x\leq 2$, $0.75\leq y\leq 2$, $0\leq z<1$ and $0\leq w<1$; or $1\leq x\leq 2$, $1\leq y\leq 2$, $0\leq z<1$ and $0\leq w<1$. For example, $0<x\leq 3$, $0<y\leq 3$, $0\leq z<0.1$, and $0\leq w<0.1$. For example, $0<x\leq 2$, $0<y\leq 2$, $0\leq z<0.05$, and $0\leq w<0.05$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

$$Li_{2+x}(Cr_{1-z}M2_z)P_2O_7(F_{1-w}Z2_w)_y \quad \text{Formula 6h}$$

In Formula 6h, M2 is a metal element selected from Co, Ni, Mn, Fe, Cu, Zn, or Ti, and a cation having a valence of at least two, Z2 is Cl or Br, $0<x\leq 4$, $0<y\leq 4$, $0\leq z<1$, and $0\leq w<1$. For example, $0<x\leq 3.5$, $0<y\leq 3.5$, $0\leq z<1$ and $0\leq w<1$; $0<x\leq 3$, $0<y\leq 3$, $0\leq z<1$ and $0\leq w<1$; $0<x\leq 2.5$, $0<y\leq 2.5$, $0\leq z<1$ and $0\leq w<1$; $0<x\leq 2$, $0<y\leq 2$, $0\leq z<1$ and $0\leq w<1$; $0.1\leq x\leq 2$, $0.1\leq y\leq 2$, $0\leq z<1$ and $0\leq w<1$; $0.5\leq x\leq 2$, $0.5\leq y\leq 2$, $0\leq z<1$ and $0\leq w<1$; $0.75\leq x\leq 2$, $0.75\leq y\leq 2$, $0\leq z<1$ and $0\leq w<1$; or $1\leq x\leq 2$, $1\leq y\leq 2$, $0\leq z<1$ and $0\leq w<1$. For example, $0<x\leq 3$, $0<y\leq 3$, $0\leq z<0.1$, and $0\leq w<0.1$. For example, $0<x\leq 2$, $0<y\leq 2$, $0\leq z<0.05$, and $0\leq w<0.05$. For example, Co, Ni, Mn, Fe, Cu, Zn, Ti, and Cr are each independently a cation having a valence of 2 to 5, a cation having a valence of 2 to 4, a cation having a valence of 2 to 3, a cation having a valence of 2 to 2.5, or a divalent cation.

In an XRD spectrum of the cathode active material, for example, a ratio Ia/Ib of a first peak intensity (Ia) at a diffraction angle 2θ of 20.5°±1.0° to a second peak intensity (Ib) at a diffraction angle 2θ of 29.0°±1.0° may be greater than 1, greater than 1 to 10, 1.1 to 8, 1.2 to 6, 1.3 to 4, 1.4 to 3, or 1.5 to 3. When the cathode active material has a peak intensity ratio in these ranges, discharge capacity may be further improved.

The cathode active material may include, for example, a phase having a monoclinic-like crystal structure. The cathode active material may be electrochemically stable by including the phase having a monoclinic-like crystal structure. The cathode active material includes, for example, a crystal phase belonging to a $P2_1/c$-like space group. The cathode active material may have further improved discharge capacity by including the crystal phase belonging to the $P2_1/c$-like space group.

The cathode active material may include, for example, other phases apart from the phase having a monoclinic-like crystal structure.

The cathode active material may include, for example, a phase having a monoclinic-like crystal structure belonging to a $P2_1/c$-like space group and including a compound represented by Formula 1. In addition, the cathode active material may additionally include, for example, a crystal phase including at least one selected from compounds represented by Formulas 7a to 7d:

$$Li_{2-p}MP_2O_7 \quad \text{Formula 7a}$$

$$LiM_{1+q}P_2O_7 \quad \text{Formula 7b}$$

$$Li_{2+r}P_2O_7 \quad \text{Formula 7c}$$

$$LiMPO_4, \quad \text{Formula 7d}$$

wherein in the formulae,

M is independently at least one metal element selected from Groups 2 to 4, or 6 to 16 of the Periodic Table, and p is independently $0<p\leq1$, q is independently $0<q\leq1$, and r is independently $0<r\leq2$. For example, M is one metal element selected from Co, Ni, Mn, Fe, Cu, Zn, or Ti.

The cathode active material may further include, for example, at least one phase selected from $Li_{1.8}MP_2O_7$, $LiM_{1.5}P_2O_7$, $Li_4P_2O_7$, or $LiMPO_4$, in addition to the phase having a monoclinic-like crystal structure.

Specific capacity of the cathode active material may be 50 mAh/g or more, 70 mAh/g or more, 80 mAh/g or more, 100 mAh/g or more, 120 mAh/g or more, 140 mAh/g or more, 160 mAh/g or more, 180 mAh/g or more, or 200 mAh/g or more. As the cathode active material has such high specific capacity, energy density of a lithium battery may be improved. Specific capacity of the cathode active material may be, for example, specific capacity measured when a lithium battery including the cathode active material is discharged from 5.5 V (vs. Li) to 4.0 V (vs. Li).

An average discharge voltage of the cathode active material may be, for example, 4 V to 6 V, 4 V to 5 V, or 4 V to 4.5 V. When a cathode active material has a high average discharge voltage in these ranges, energy density of a lithium battery including the cathode active material may be enhanced. An average discharge voltage of a cathode active material may be a voltage obtained by dividing an integrated value of an area of a profile by discharge capacity, in a discharge profile graph for discharge voltage and specific capacity.

The cathode active material may further include a carbon-based coating layer arranged on a surface of the cathode active material. The carbon-based coating layer may be, for example, a conductive coating layer. The carbon-based material included by the carbon-based coating layer is not particularly limited, and any used as a carbon-based material in the art may be used. The carbon-based material may be, for example, carbon black, graphite particles, natural graphite, artificial graphite, acetylene black, ketjen black, carbon fibers, carbon nanotube, etc. Alternatively, the carbon-based material may be a carbide of an organic material such as a high molecular compound or a low molecular compound.

The cathode active material including a carbon-based coating layer arranged on a surface of the cathode active material may be represented by Formula 8 below:

$$(1-s)A_{2+x}MP_2O_7Z_y\text{-}sC, \quad \text{Formula 8}$$

wherein in the formula,

A is at least one element selected from Group 1 of the Periodic Table,

M is at least one metal element selected from Groups 2 to 4, or 6 to 16 of the Periodic Table, and is a cation having a valence of at least two, Z is at least one element selected from Group 17 of the Periodic Table, C is carbon, and $0<s\leq0.2$, $0<x\leq4$ and $0<y\leq4$. For example, $0<s\leq0.18$, $0<s\leq0.16$, $0<s\leq0.14$, $0<s\leq0.12$, $0<s\leq0.1$, $0<s\leq0.08$, $0<s\leq0.06$, $0<s\leq0.04$, $0<s\leq0.02$, or $0<s\leq0.01$.

An average particle diameter of first particles of the cathode active material may be, for example, 50 nanometers (nm) to 1,000 nm, 50 nm to 900 nm, 50 nm to 800 nm, 50 nm to 700 nm, 50 nm to 600 nm, 50 nm to 500 nm, 50 nm to 400 nm, 50 nm to 300 nm, or 50 nm to 200 nm. The average particle diameter of first particles of the cathode active material may be measured by using a particle size analyzer (PSA). Alternatively, the average particle diameter of first particles of the cathode active material may be measured by analyzing an SEM image of a cross-section of second particles.

Second particles of the cathode active material may include an aggregate of a plurality of first particles of the cathode active material. An average particle diameter of second particles of the cathode active material may be, for example, 200 nm to 50 micrometers (μm), 500 nm to 40 μm, 500 nm to 30 μm, 500 nm to 25 μm, 500 nm to 20 μm, 500 nm to 15 μm, 500 nm to 10 μm. The average particle diameter of second particles of the cathode active material may be measured by using a particle size analyzer (PSA).

A cathode according to another embodiment includes the above-described cathode active material. A cathode may provide an enhanced discharge capacity by including the above-described cathode active material.

A cathode may be prepared by, for example, the following example method, but a preparation method is not limited thereto, and may be adjusted according to required conditions.

First, a cathode active material composition is prepared by mixing the above-described cathode active material, a conductive material, a binder, and a solvent. The prepared cathode active material composition may be directly coated on an aluminum current collector and dried, to prepare a cathode electrode plate on which a cathode active material layer is formed. Alternatively, the cathode active material composition may be casted on a separate support, and a film peeled off from the support is laminated on the aluminum current collector, to prepare a cathode electrode plate on which a cathode active material layer is formed.

As the conductive material, carbon black, graphite fine particles, natural graphite, artificial graphite, acetylene black, ketjen black, and carbon fiber; carbon nanotubes; metal powder, metal fiber or metal tube of copper, nickel, aluminum, or silver; conductive polymers such as polyphenylene derivatives may be used, but is not limited thereto, and any conductive material used in the art may be used.

As the binder, vinylidene fluoride/hexafluoropropylene copolymer, polyvinylidene fluoride, polyacrylonitrile, polymethylmethacrylate, polytetrafluoroethylene (PTFE), mixtures of the aforementioned polymers, styrene butadiene rubber-based polymer or the like are used, and as a solvent, N-methylpyrrolidone (NMP), acetone, water, etc. may be used, but is not necessarily limited thereto, and any used in the art may be used.

It is also possible to form pores in the electrode plate by further adding a plasticizer or a pore former to the cathode active material composition.

Amounts of the composite cathode active material, conductive material, binder, and solvent used in the cathode are a level commonly used in lithium batteries. Depending on use and configuration of the lithium battery, one or more of the conductive material, binder, and solvent may be omitted.

In addition, the cathode may additionally include other general cathode active materials in addition to the above-described composite cathode active material.

The general cathode active material may be, a metal oxide containing lithium, and any one commonly used in the art may be used without limitation. For the conventional cathode active material, any compound represented by any one of the formulas below may be used, the formulas including: $Li_aA_{1-b}B'_bD_2$ (wherein $0.90 \le a \le 1$, and $0 \le b \le 0.5$); $Li_aE_{1-b}B'_bO_{2-c}D_c$ (wherein $0.90 \le a \le 1$, $0 \le b \le 0.5$, and $0 \le c \le 0.05$); $LiE_{2-b}B'_bO_{4-c}D_c$ (wherein $0 \le b \le 0.5$, and $0 \le c \le 0.05$); $Li_aNi_{1-b-c}Co_bB'_cD_\alpha$ (wherein $0.90 \le a \le 1$, $0 \le b \le 0.5$, $0 \le c \le 0.05$, and $0 < \alpha \le 2$); $Li_aNi_{1-b-c}Co_bB'_cO_{2-\alpha}F_\alpha$ (wherein $0.90 \le a \le 1$, $0 \le b \le 0.5$, $0 \le c \le 0.05$, and $0 < \alpha < 2$); $Li_aNi_{1-b-c}Co_bB'_cO_{2-\alpha}F'_2$ (wherein $0.90 \le a \le 1$, $0 \le b \le 0.5$, $0 \le c \le 0.05$, and $0 < \alpha < 2$); $Li_aNi_{1-b-c}Mn_bB'_cD_\alpha$ (wherein $0.90 \le a \le 1$, $0 \le b \le 0.5$, $0 \le c \le 0.05$, and $0 < \alpha \le 2$); $Li_aNi_{1-b-c}Mn_bB'_cO_{2-\alpha}F'_\alpha$ (wherein $0.90 \le a \le 1$, $0 \le b \le 0.5$, $0 \le c \le 0.05$, and $0 < \alpha < 2$); $Li_aNi_{1-b-c}Mn_bB'_cO_{2-\alpha F}'_2$ (wherein $0.90 \le a \le 1$, $0 \le b \le 0.5$, $0 \le c \le 0.05$, and $0 < \alpha < 2$); $Li_aNi_bE_cG_dO_2$ (wherein $0.90 \le a \le 1$, $0 \le b \le 0.9$, $0 \le c \le 0.5$, and $0.001 \le d \le 0.1$.); $Li_aNi_bCo_cMn_dG_eO_2$ (wherein $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1$, and $0.001 \le b \le 0.1$); $Li_aCoG_bO_2$ (wherein $0.90 \le a \le 1$, and $0.001 \le b \le 0.1$); $Li_aMnG_bO_2$ (wherein $0.90 \le a \le 1$, and $0.001 \le b \le 0.1$); $Li_aMn_2G_bO_4$ (wherein $0.90 \le a \le 1$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formulas representing the above-described compound, A may be Ni, Co, Mn, or a combination thereof; B' may be Al, Ni, Co, Mn, Cr, Fe, Mg, Sr, V, a rare earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

A compound to which a coating layer is added on the surface of the above-described compound may be used, and a mixture of the above-described compound and the compound to which a coating layer is added may also be used.

The coating layer added on the surface of the above-described compound may include, for example, coating element compounds such as an oxide of the coating element, a hydroxide of the coating element, an oxyhydroxide of the coating element, an oxycarbonate of the coating element, or a hydroxycarbonate of the coating element. The compound that forms such a coating layer may be amorphous or crystalline. The coating element included in the coating layer may be Mg, Al, Co, K, Na, Ca, Si, Ti, V, Sn, Ge, Ga, B, As, Zr, or a mixture thereof. A method of forming a coating layer may be selected within a range that the method does not adversely affect the physical properties of the cathode active material. The coating method may be, for example, a spray coating method, an immersion method, etc. Specific coating methods may be well understood by those skilled in the art, and a detailed description is omitted.

A cathode may include, for example, the above-described cathode active material represented by Formula 1, and an olivine-based cathode active material.

The olivine-based cathode active material is, for example, represented by Formula 9 below:

$$Li_xM8_yM9_zPO_{4-\alpha}X_\alpha, \quad \text{Formula 9}$$

wherein in the formula, $0.90 \le x \le 1.1$, $0 \le y \le 0.9$, $0 \le z \le 0.5$, $1-y-z>0$, and $0 \le \alpha \le 2$, M8 is at least one metal selected from the group consisting of Ti, V, Cr, Mn, Fe, Co, Ni, Cu, Al, Mg, and Zr, M9 is at least one selected from the group consisting of Mg, Ca, Sr, Ba, Ti, Zr, Nb, Mo, W, Zn, Al, Si, Ni, Mn, Cr, Fe, V, or rare earth elements, and X is an element selected from the group consisting of O, F, S and P.

The olivine-based cathode active material is, for example, $LiFePO_4$, $LiNiPO_4$, $LiMnPO_4$, $LiCoPO_4$, etc.

An amount of the olivine-based cathode active material included in a cathode may be, for example, 10 wt % or less, 9 wt % or less, 8 wt % or less, 7 wt % or less, 6 wt % or less, or 5 wt % or less, of a total weight of the cathode active material. The amount of the olivine-based cathode active material included in the cathode may be, for example, 1 wt % to 10 wt %, 1 wt % to 9 wt %, 1 wt % to 8 wt %, 1 wt % to 7 wt %, 1 wt % to 6 wt % or 1 wt % to 5 wt %, of the total weight of the cathode active material. The amount of the olivine-based cathode active material included in the cathode may be, for example, 1 part by weight to 10 parts by weight, 1 part by weight to 9 parts by weight, 1 part by weight to 8 parts by weight, 1 part by weight to 7 parts by weight, or 1 part by weight to 6 parts by weight, with respect to 100 parts by weight of the composite cathode active material. Cycle characteristics of a lithium battery may be further enhanced by the cathode further including the olivine-based cathode active material in these content ranges.

A lithium battery according to another embodiment employs a cathode including the above-described cathode active material.

As the lithium battery employs the cathode including the above-described cathode active material, an improved energy density is provided.

A lithium battery is prepared by, for example, the following example method, but a preparation method is not necessarily limited to this method and may be adjusted depending on required conditions.

First, a cathode is prepared according to the above-described cathode preparation method.

Next, an anode is prepared as follows. The anode is prepared in substantially the same manner as the cathode except that, for example, an anode active material is used instead of a composite cathode active material. Also, in an anode active material composition, it is possible to use substantially the same conductive agent, binder, and solvent as in the cathode.

For example, an anode material composition is prepared by mixing an anode active material, a conductive material, a binder, and a solvent, and an anode electrode plate is prepared by directly coating the anode active material composition on a copper current collector. Alternatively, an anode plate is prepared by casting the prepared anode active material composition on a separate support and laminating the anode active material film peeled from the support on a copper current collector.

For the anode active material, any that may be used as an anode active material in the related art may be used. For example, the anode active material may include one or more selected from lithium metals, metals alloyable with lithium, transition metal oxides, non-transition metal oxides, and carbon-based materials.

The metals alloyable with lithium may be, for example, Si, Sn, Al, Ge, Pb, Bi, Sb, and an Si—Y' alloy (Y' may be an alkali metal, alkaline earth metal, Group 13 element, Group 14 element, transition metal, rare earth element, or a combination thereof, and is not Si), an Sn—Y' alloy (Y' may be an alkali metal, alkaline earth metal, Group 13 element, Group 14 element, transition metal, rare earth element, or a combination thereof, and is not Sn), and the like. Y' may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be, for example, a lithium titanium oxide, a vanadium oxide, a lithium vanadium oxide, or the like.

The non-transition metal oxides may be, for example, $SnO_2$, $SiO_x$ ($0<x<2$), and the like.

The carbon-based material may be, for example, crystalline carbon, amorphous carbon, or mixtures thereof. The crystalline carbon may be, for example, graphite, such as natural or artificial graphite, in an amorphous, plate-like, flake-like, spherical, or fibrous form. The amorphous carbon may be, for example, soft carbon (carbon calcined at a low temperature) or hard carbon, mesophase pitch carbide, calcined coke, or the like.

Amounts of the anode active material, conductive material, binder, and solvent are levels commonly used in lithium batteries. Depending on use and configuration of the lithium battery, one or more of the conductive material, binder, and solvent may be omitted.

Next, a separator to be inserted between the cathode and the anode is prepared.

For the separator, all that are used in a lithium battery in the art may be used. For the separator, for example, a separator having low resistance to ion movement of an electrolyte and an excellent ability to be impregnated with an electrolyte solution is used.

The separator may be, for example, selected from glass fiber, polyester, Teflon, polyethylene, polypropylene, polytetrafluoroethylene (PTFE), or combinations thereof, and may be in a form of a nonwoven or woven fabric. For example, a winding separator such as polyethylene, polypropylene, and the like may be used in a lithium ion cell, and a separator having an excellent ability to be impregnated with an organic electrolyte solution may be used in a lithium ion polymer cell.

The separator is prepared by, for example, the following example method, but a preparation method is not necessarily limited thereto, and may be adjusted according to required conditions.

First, a separator composition is prepared by mixing a polymer resin, a filler, and a solvent. The separator composition is directly coated on the electrode and dried to form a separator. Alternatively, after the separator composition is casted and dried on a support, a separator film peeled from the support is laminated on an electrode to form a separator.

The polymer used for preparing the separator is not particularly limited, and any polymer used as a binder of an electrode plate may be used. For example, vinylidene fluoride/hexafluoropropylene copolymer, polyvinylidene fluoride (PVDF), polyacrylonitrile, polymethyl methacrylate, or a mixture thereof, may be used.

Next, an electrolyte is prepared.

The electrolyte is, for example, an organic electrolyte solution. The organic electrolyte solution is prepared by, for example, dissolving a lithium salt in an organic solvent.

For the organic solvent, all that may be used as an organic solvent in the art may be used. The organic solvent may be, for example, fluoroethylene carbonate, bis(2,2,2,-trifluoroethyl) carbonate, propylene carbonate, ethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, and dibutyl carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

For the lithium salts, all that may be used as lithium salts in the art may be used. The lithium salts may be, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ ($1 \leq x \leq 20$, and $1 \leq y \leq 20$), LiBOB, LiCl, LiI, or a mixture thereof.

Alternatively, the electrolyte may be a solid electrolyte. The solid electrolyte may be, for example, boron oxide, lithium oxynitride, and the like, but is not limited thereto, and all that may be used as a solid electrolyte in the related art may be used. The solid electrolyte is formed on the anode electrode by, for example, sputtering, or a separate solid electrolyte sheet is stacked on the anode electrode.

The solid electrolyte is, for example, an oxide-based solid electrolyte, or a sulfide-based solid electrolyte.

The solid electrolyte is, for example, an oxide-based solid electrolyte. The oxide-based solid electrolyte may be at least one selected from $Li_{1+x+y}Al_xTi_{2-x}Si_yP_{3-y}O_{12}$ ($0<x<2$, and $0 \leq y<3$), $BaTiO_3$, $Pb(Zr,Ti)O_3$ (PZT), $Pb_{1-x}La_xZr_{1-y}Ti_yO_3$ (PLZT) ($0 \leq x<1$, and $0 \leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$($0<x<2$, and $0<y<3$), $Li_xAl_yTi_z(PO_4)_3$ ($0<x<2$, $0<y<1$, and $0<z<3$), $Li_{1+x+y}(Al, Ga)_x(Ti, Ge)_{2-x}Si_yP_{3-y}O_{12}$ ($0 \leq x \leq 1$, and $0 \leq y \leq 1$), $Li_xLa_yTiO_3$ ($0<x<2$, and $0<y<3$), $Li_2O$, LiOH, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (M=Te, Nb, or Zr, x is an integer of 1 to 10). The solid electrolyte is produced by a sintering method or the like. For example, the oxide-based solid electrolyte is a garnet-type solid electrolyte selected from $Li_7La_3Zr_2O_{12}$ (LLZO), and $Li_{3+x}La_3Zr_{2-a}M_aO_{12}$ (M doped LLZO, M=Ga, W, Nb, Ta, or Al, x is an integer of 1 to 10.

The sulfide-based solid electrolyte may include, for example, lithium sulfide, silicon sulfide, phosphorus sulfide, boron sulfide, or a combination thereof. Sulfide-based solid electrolyte particles may include $Li_2S$, $P_2S_5$, $SiS_2$, $GeS_2$, $B_2S_3$, or a combination thereof. The sulfide-based solid electrolyte particles may be $Li_2S$, or $P_2S_5$. The sulfide-based solid electrolyte particles are known to have high lithium ion conductivity, compared to other inorganic compounds. For example, the sulfide-based solid electrolyte includes $Li_2S$, and $P_2S_5$. When a sulfide solid electrolyte material constituting the sulfide-based solid electrolyte includes $Li_2S—P_2S_5$, a mixing molar ratio of $Li_2S$ to $P_2S_5$ may be, for example, in a range of about 50:50 to about 90:10. In addition, an inorganic solid electrolyte prepared by adding $Li_3PO_4$, halogen, a halogen compound, $Li_{2+2x}Zn_{1-x}GeO_4$ ("LISICON", $0 \leq x < 1$), $Li_{3+y}PO_{4-x}N_x$ ("LIPON", $0<x<4$, and $0<y<3$), $Li_{3.25}Ge_{0.25}P_{0.75}S_4$ ("ThioLISICON"), $Li_2O—Al_2O_3—TiO_2—P_2O_5$ ("LATP") to an inorganic solid electrolyte of $Li_2S—P_2S_5$, $SiS_2$, $GeS_2$, $B_2S_3$, or a combination thereof may be used as a sulfide solid electrolyte. Non-limiting examples of sulfide solid electrolyte materials include: $Li_2S—P_2S_5$; $Li_2S—P_2S_5—LiX$ (X=halogen element); $Li_2S—P_2S_5—Li_2O$; $Li_2S—P_2S_5—Li_2O—LiI$; $Li_2S—SiS_2$; $Li_2S—SiS_2—LiI$; $Li_2S—SiS_2—LiBr$; $Li_2S—SiS_2—LiCl$; $Li_2S—SiS_2—B_2S_3—LiI$; $Li_2S—SiS_2—P_2S_5—LiI$; $Li_2S—B_2S_3$; $Li_2S—P_2S_5—Z_mS_n$ ($0<m<10$, $0<n<10$, and Z=Ge, Zn, or Ga); $Li_2S—GeS_2$; $Li_2S—SiS_2—Li_3PO_4$; and $Li_2S—SiS_2—Li_pMO_q$ ($0<p<10$, $0<q<10$, and M=P, Si, Ge, B, Al, Ga, or In). In this regard, the sulfide-based solid electrolyte material may be prepared by treating raw starting materials (for example, $Li_2S$, $P_2S_5$, etc.) of the sulfide-based solid electrolyte material by a melt quenching method, a mechanical milling method, or the like. Also, calcinations may be performed after the treatment. The sulfide-based solid electrolyte may be in an amorphous state, a crystalline state, or a mixed state thereof.

Figure 4:
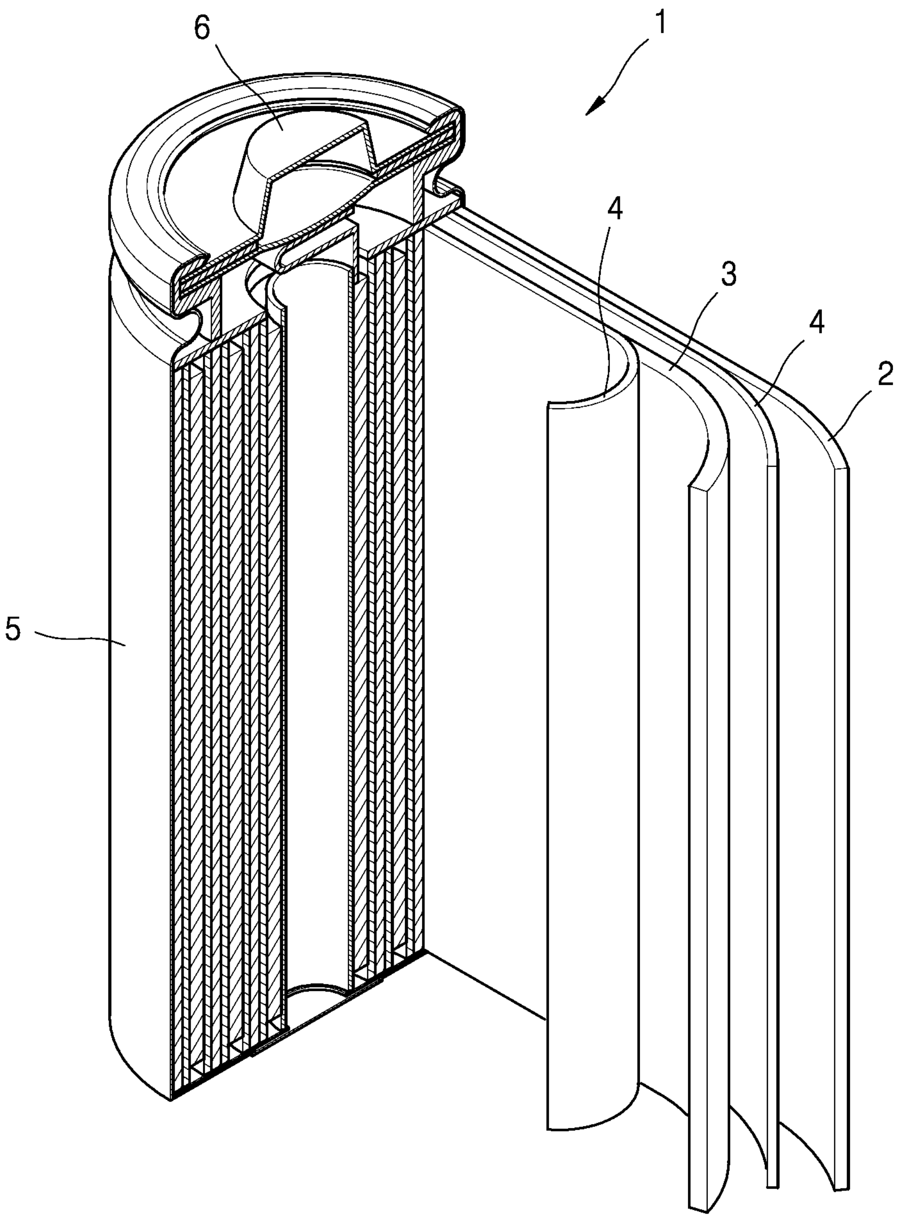
FIG. 4 shows a schematic diagram of a lithium battery according to an embodiment.

As shown in FIG. 4, the lithium battery 1 includes a cathode 3, an anode 2, and a separator 4. The cathode 3, anode 2, and separator 4 are wound or folded to be accommodated in a battery case 5. An organic electrolyte solution is injected into the battery case 5 and the battery case is sealed with a cap assembly 6 to complete the lithium battery 1. The battery case 5 may be a cylindrical type, but is not necessarily limited to such a shape and may be, for example, a prismatic type, thin film type, or the like.

A pouch-type lithium battery includes one or more battery structures. A separator may be arranged between a cathode and an anode to form a battery structure. After the battery structures are stacked in a bi-cell structure, the battery structures are impregnated with an organic electrolyte, and accommodated and sealed in a pouch to complete a pouch-type lithium battery. A plurality of the battery structures may be stacked to form a battery pack, and such a battery pack may be used in all devices requiring high capacity and high output. For example, the battery pack may be used in laptops, smartphones, electric vehicles, and the like.

Since the lithium battery is excellent in lifespan characteristics and high rate characteristics, the lithium battery may be used in electrical vehicles (EV). For example, the lithium battery may be used in a hybrid vehicle such as a plug-in hybrid electric vehicle (PHEV). Furthermore, the lithium battery may be used in a field in which a large amount of power storage is required. For example, the lithium battery is used in electric bicycles, power tools, and the like.

Provided according to still another embodiment is a method of preparing a cathode active material including: preparing a first composition by mixing an element A precursor, an element Z precursor, element M precursor, and a phosphorus (P) precursor in a stoichiometric ratio to obtain a composition of Formula 1 below; and drying and heat-treating the first composition in an oxidizing, or an inert atmosphere at 400° C. to 1,000° C. for 3 hours to 20 hours.

$$A_{2+x}MP_2O_7Z_y, \quad \text{Formula 1}$$

wherein in Formula 1,

A is at least one element selected from Group 1 of the Periodic Table,

M is at least one metal element selected from Groups 2 to 4, or 6 to 16 of the Periodic Table, and is a cation having a valence of at least two, Z is at least one element selected from Group 17 of the Periodic Table, $0<x\leq 4$, and $0<y\leq 4$.

First, a first composition is prepared by mixing an element A precursor, an element Z precursor, element M precursor, and a phosphorus (P) precursor in a stoichiometric ratio.

Preparing the first composition may be performed, for example, in a dry manner without a solvent. The first composition is, for example, a dry powder in which the precursor powders are mixed. Alternatively, preparation of the first composition may be performed, for example, in a wet manner including a solvent. The precursors may be mixed by using an agitator such as a ball mill. In the wet method, the solvent used when mixing the precursors may be water or an organic solvent.

Preparation of the first composition may be performed with the element A precursor, the element Z precursor, the element M precursor, and the phosphorus (P) element precursor in an organic solvent by using a ball mill. The organic solvent may be an alcohol such as acetone or 2-propanol, but is not limited thereto, and any solvent used in the art may be used.

The element A precursor is, for example, a salt of A or an oxide of A, the element Z precursor is, for example, a salt of Z or an oxide of Z, the element M precursor is, for example, a salt of M or an oxide of M, the phosphorus (P) precursor is, for example, a salt of phosphorus (P) or an oxide of phosphorus (P).

The element A precursor may be, for example, a lithium precursor. The lithium precursor may be, for example, $Li_2CO_3$, $LiNO_3$, $LiNO_2$, $LiOH$, $LiOH·H_2O$, LiH, LiF, LiCl, LiBr, LiI, $CH_3OOLi$, $Li_2O$, $Li_2SO_4$, lithium dicarboxylate, lithium citrate, lithium fatty acid, and alkyl lithium, etc., but is not limited thereto, and all that may be used as a lithium precursor in the art may be used.

The element Z precursor may be, for example, at least one halogen precursor. The halogen precursor may be, for example, LiF, LiCl, LiBr, LiI, $MF_2$, $MCl_2$, $MBr_2$, $MI_2$, etc., but is not limited thereto, and all that may be used as a halogen precursor in the art may be used.

The element M precursor may be a precursor of at least one metal selected from, for example, Mg, Ca, Sr, Ba, Sc, Y, Ti, Zr, Hf, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, Se, Te, or Po. For example, the M element precursor is at least one precursor selected from a Co precursor, an Ni precursor, an Mn precursor, a Fe precursor, a Cu precursor, a Zn precursor, a Ti precursor, or a Cr precursor. The Co precursor may be, for example, $Co_3O_4$, $Co(OH)_2$, $Co(NO_3)_2·H_2O$, CoO, $CoCl_2$, $CoF_2$, etc., but is not limited thereto, and all that may be used as a Co precursor in the art may be used. The Ni precursor may be, for example, $NiCl_2$, $NiSO_4$, etc., but is not limited thereto, and all that may be used as an Ni precursor in the art may be used. The Mn precursor may be, for example, MnO, $Mn_2O_3$, etc., but is not limited thereto, and all that may be used as an Mn precursor in the art may be used. The Fe precursor may be, for example, $Fe_2O_3$, $FeCl_2$, etc., but is not limited thereto, and all that may be used as a Fe precursor in the art may be used.

The phosphorous (P) precursor may be, for example, phosphates of metals or ammonium, etc., but is not limited thereto, and all compounds including phosphorous (P) that may be used in the art may be used. For example, the phosphorous (P) precursor may be, for example, $(NH_4)_2HPO_4$, $(NH_4)_3PO_4$, etc.

Next, the first composition is dried and heat-treated in an oxidizing, or inert atmosphere at 400° C. to 1,000° C. for 3 hours to 20 hours.

The drying of the first composition may be performed at room temperature or at a temperature of 50° C. to 150° C. The drying of the first composition may be omitted.

The cathode active material is prepared by a solid phase reaction of the first composition. The solid phase reaction refers to a reaction that is proceeded by heat-treatment in a solvent-free state.

The heat treatment may be performed, for example, at 400° C. to 1,000° C., 500° C. to 900° C., 600° C. to 800° C., or 700° C. to 750° C. Heat treatment time may be, for example, 3 hours to 20 hours, 3 hours to 10 hours, 3 hours to 7 hours, or 4 hours to 6 hours. A heating rate to the temperature at which the heat treatment is performed is, for example, 1° C./minute (min) to 10° C./min. As the heat treatment temperature, heat treatment time, and heating rate have the above-described ranges, the cathode active material of Formula 1 is formed.

The heat treatment atmosphere may be an oxidizing atmosphere or an inert atmosphere. The oxidizing atmosphere is an atmosphere including oxygen or air. The oxidizing atmosphere includes oxygen, air, or a combination thereof, and for example, is air having an increased oxygen content. The inert atmosphere is an argon atmosphere or a nitrogen atmosphere, but it is not necessarily limited to these atmospheres, and any used as an inert atmosphere in the art may be used.

EXAMPLES

The present disclosure is explained in more detail through the following examples and comparative examples. However, the examples are for exemplifying the present disclosure, and the scope of the present disclosure is not limited thereto.

(Preparation of Cathode Active Material)

Example 1: $Li_{2.25}CoP_2O_7F_{0.25}$

A mixture was prepared by mixing $Li_2CO_3$ as a lithium precursor, LiF as a fluorine precursor, $Co(NO_3)_2 \cdot H_2O$ as a cobalt precursor, and $(NH_4)_2HPO_4$ as a phosphorus (P) precursor in a stoichiometric ratio for obtaining a desired composition. The obtained mixture was put into a furnace and heat-treated for 12 hours in an air atmosphere at 600° C. while flowing oxygen to prepare a cathode active material. A composition of the prepared cathode active material was $Li_{2.25}CoP_2O_7F_{0.25}$.

Example 2: $Li_{3.0}CoP_2O_7F_{1.0}$

A mixture was prepared by mixing $Li_2CO_3$ as a lithium precursor, LiF as a fluorine precursor, $Co(NO_3)_2 \cdot H_2O$ as a cobalt precursor, and $(NH_4)_2HPO_4$ as a phosphorus (P) precursor in a stoichiometric ratio for obtaining a desired composition. The obtained mixture was put into a furnace and heat-treated for 12 hours in an air atmosphere at 600° C. while flowing oxygen to prepare a cathode active material. A composition of the prepared cathode active material was $Li_{3.0}CoP_2O_7F_{1.0}$.

Comparative Example 1: $Li_2CoP_2O_7$

A mixture was prepared by mixing $Li_2CO_3$ as a lithium precursor, $Co(NO_3)_2 \cdot H_2O$ as a cobalt precursor, and $(NH_4)_2HPO_4$ as a phosphorus (P) precursor in a stoichiometric ratio for obtaining a desired composition. The obtained mixture was put into a furnace and heat-treated for 12 hours in an air atmosphere at 600° C. to prepare a cathode active material. A composition of the prepared cathode active material was $Li_2CoP_2O_7$.

Comparative Example 2: $Li_{1.6}CoP_2O_7$

A mixture was prepared by mixing $Li_2CO_3$ as a lithium precursor, $Co(NO_3)_2 \cdot H_2O$ as a cobalt precursor, and $(NH_4)_2HPO_4$ as a phosphorus (P) precursor in a stoichiometric ratio for obtaining a desired composition. The obtained mixture was put into a furnace and heat-treated for 12 hours in an air atmosphere at 600° C. to prepare a cathode active material. A composition of the prepared cathode active material was $Li_{1.6}CoP_2O_7$.

(Preparation of Lithium Battery (Half-Cell))

Example 3

(Preparation of Cathode)

A mixture in which the cathode active material prepared in Example 1, carbon conductive material (Super-P), and polyvinylidene fluoride (PVDF) are mixed in a weight ratio of 50:30:20 was mixed with N-methylpyrrolidone (NMP) in an agate mortar to prepare slurry. The slurry was bar-coated on a 15 μm-thick aluminum current collector, dried at room temperature, dried again under a vacuum condition at 120° C., and then rolled and punched to prepare a cathode plate having a loading level of about 1 microgram per square centimeter (mg/cm$^2$).

(Preparation of Coin Cell)

Coin cells were prepared by using the cathode plate prepared above, lithium metal as a counter electrode, a polyethylene (PE) separator, and a solution, in which 1.0 molar (M) of $LiPF_6$ is dissolved in a mixture of fluoro ethylene carbonate (FEC) and bis (2,2,2-trifluoroethyl)carbonate (HFDEC) mixed in a volume ratio of 1:1, as an electrolyte.

Example 4

Coin cell was prepared in the same manner as in Example 3, except that the cathode active materials prepared in Example 2 was used instead of the composite cathode active material prepared in Example 1.

Comparative Examples 3 and 4

Coin cells were prepared in the same manner as in Example 3, except that each of the cathode active materials prepared in Comparative Examples 1 and 2 was used instead of the composite cathode active material prepared in Example 1.

Evaluation Example 1: Evaluation of XRD Spectrum

X-ray diffraction (XRD) spectra of the cathode active materials of Examples 1 to 2 and Comparative Examples 1 to 2 were measured, and the results are shown in FIG. 1. CuKα radiation was used to measure the XRD spectra.

In the XRD spectra, it was confirmed that the compounds of Examples 1 and 2 include a crystal phase having a monoclinic-like crystal structure, and the crystal phase belongs to a $P2_1/c$-like space group.

The compounds of Examples 1 and 2 had similar symmetry to the $P2_1/c$ space group, but had relatively low symmetry compared to the $P2_1/c$ space group.

This relatively reduced symmetry was determined to be due to reduced regularity of the crystal structure due to introduction of excess lithium into the $Li_2MP_2O_7$ crystal structure.

As shown in FIG. 1, the cathode active materials of Examples 1 and 2 had a peak intensity (Ia) at a diffraction angle 2θ=20.5°±1.0° far greater than a peak intensity (Ib) at a diffraction angle 2θ=29.5°±1.0°.

That is, the cathode active materials of Examples 1 and 2 had a ratio Ia/Ib of a peak intensity (Ia) at a diffraction angle 2θ=20.5°±1.0° to a peak intensity (Ib) at a diffraction angle 2θ=29.0°±1.0°, of greater than 1.

The peak intensity ratio Ia/Ib of the cathode active material of Example 1 was 2.3, and the peak intensity ratio Ia/Ib of the cathode active material of Example 2 was 2.7.

In contrast, the cathode active materials of Comparative Examples 1 and 2 had a peak intensity (Ia) at a diffraction angle 2θ=20.5°±1.0° smaller than a peak intensity (Ib) at a diffraction angle 2θ=29.5°±1.0°.

That is, the cathode active materials of Comparative Examples 1 and 2 had a ratio Ia/Ib of a peak intensity (Ia) at a diffraction angle 2θ=20.5°±1.0° to a peak intensity (Ib) at a diffraction angle 2θ=29.0°+1.0°, of less than 1.

The peak intensity ratio Ia/Ib of the cathode active material of Comparative Example 1 was 1/3.2, and the peak intensity ratio Ia/Ib of the cathode active material of Comparative Example 2 was 1/5.2.

In addition, as shown in FIG. 1, the cathode active materials of Examples 1 and 2 additionally included peaks resulting from a phase with a composition of $Li_{1.8}CoP_2O_7$, a phase with a composition of $LiCo_{1.5}P_2O_5$, a phase with a composition of $Li_4O_2O_7$, and a phase with a composition of $LiCoPO_4$. Accordingly, it was confirmed that the cathode active materials of Examples 1 and 2 additionally included crystal phases resulting from the above-described compounds in addition to the target composition.

Evaluation Example 2: Evaluation of DFT Calculation

Figure 2:
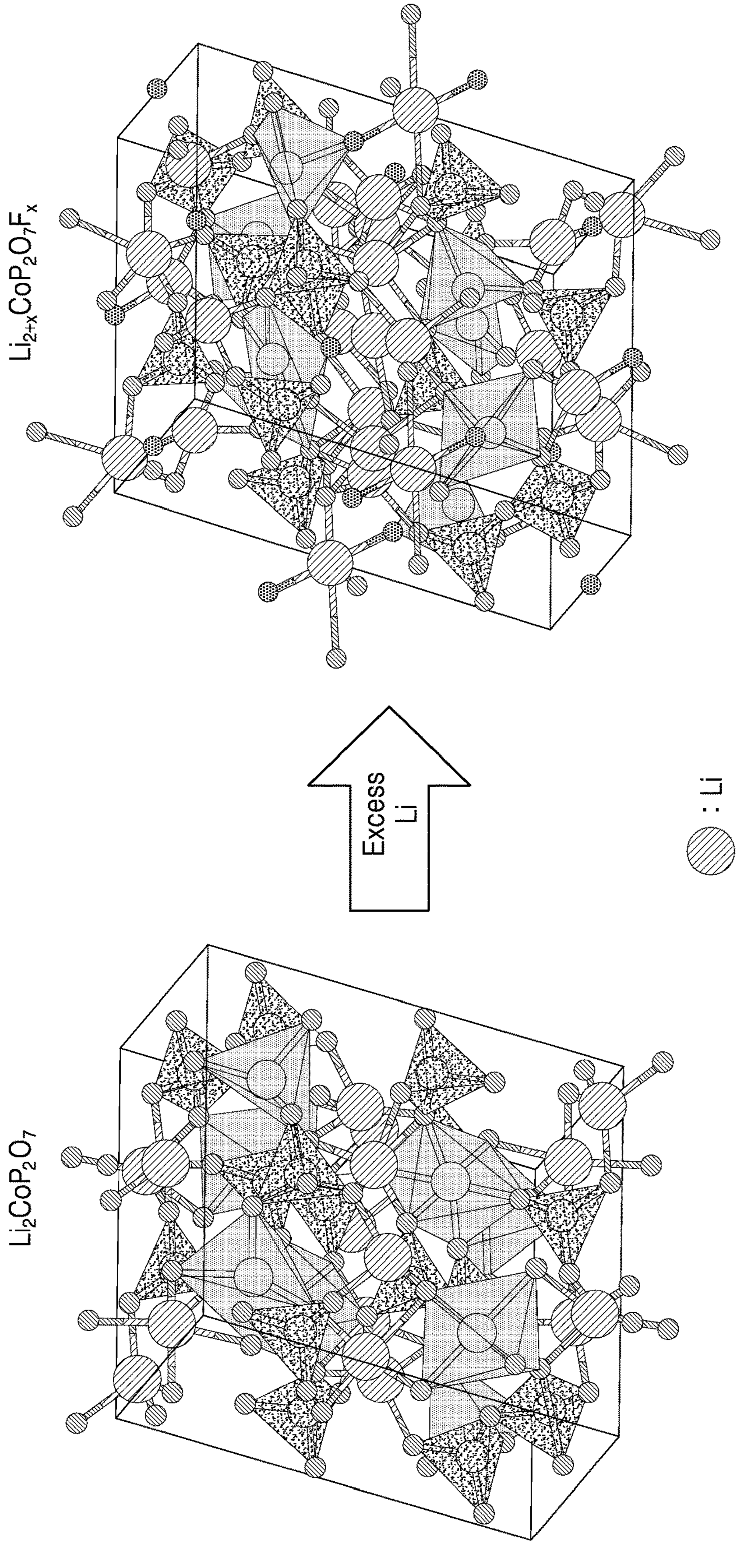
FIG. 2 shows a schematic diagram of an embodiment of a $Li_2CoP_2O_7$-type structure including excess lithium.

Schematic diagrams of a $Li_2CoP_2O_7$-type structure reflecting results of density functional theory (DFT) calculation for $Li_{2+x}CoP_2O_7F_y$ (0<x≤4, and 0<y≤4) including the compositions of Examples 1 and 2, and $Li_2CoP_2O_7$ of Comparative Example 1 are shown in FIG. 2.

As shown in FIG. 2, it was confirmed in $Li_{2+x}CoP_2O_7F_y$ (0<x≤4, and 0<y≤4) including Examples 1 and 2, compared to $Li_2CoP_2O_7$ of Comparative Example 1, excess lithium was arranged in a lithium layer arranged between metal-including layers.

That is, $Li_{2+x}CoP_2O_7F_y$ (0<x≤4, and 0<y≤4) including Examples 1 and 2 was found to have a relaxed crystal structure, compared to $Li_2CoP_2O_7$ of Comparative Example 1.

Therefore, $Li_{2+x}CoP_2O_7F_y$ (0<x≤4, and 0<y≤4) including Examples 1 and 2 was found to have reduced barriers to lithium migration and increased capacity, due to including excess lithium.

Evaluation Example 3: Evaluation of Charge/Discharge Characteristics at Room Temperature Lithium batteries prepared in Examples 3 and 4, and Comparative Examples 3 and 4 were charged at 25° C. at a constant current of 0.1 C rate until the voltage reached 5.5 V (vs. Li), and then, discharged at a constant current of 0.025 C rate until the voltage reached 3.0 V (vs. Li) during the discharge.

Figure 3:
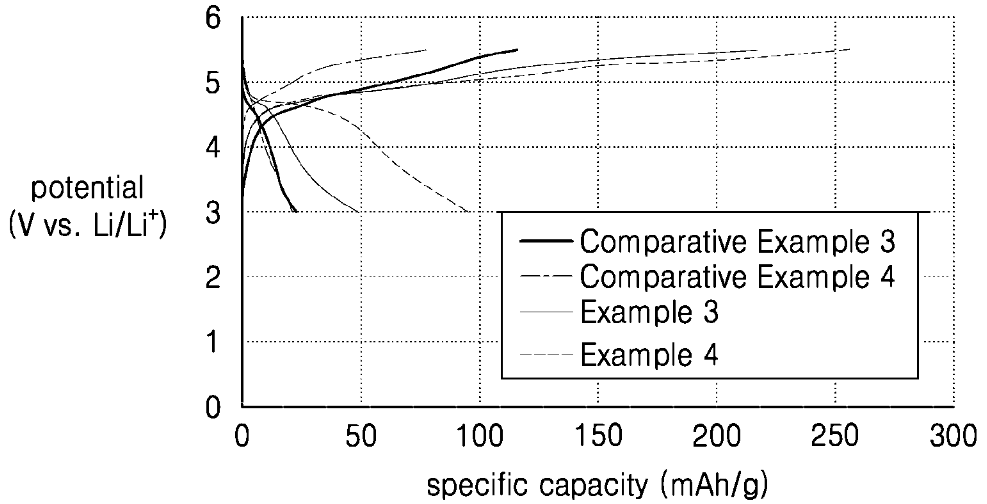
FIG. 3 shows charge/discharge profiles of lithium batteries prepared in Examples 3 to 4, and Comparative Examples 3 to 4.

The charge/discharge test results are shown in FIG. 3 and Table 1 below.

TABLE 1

| | Discharge capacity [mAh/g] |
|---|---|
| Example 4 | 95 |
| Example 3 | 49 |
| Comparative Example 3 | 23 |
| Comparative Example 4 | 21 |

As shown in FIG. 3 and Table 1, lithium batteries of Examples 3 to 4 had significantly improved discharge capacity compared to the lithium batteries of Comparative Examples 3 to 4, and a discharge voltage of 4 V or more.

According to an aspect, a discharge capacity density of a lithium battery is improved by using a cathode active material of a new composition including excess lithium.

The invention claimed is:

1. A cathode active material represented by Formula 2:

$$Li_{2+a}MP_2O_7Z_b \quad \text{Formula 2}$$

wherein in Formula 2,

M is at least one metal element selected from Groups 2 to 4, or 6 to 16 of the Periodic Table, and is a cation having a valence of at least two, Z is at least one element selected from Group 17 of the Periodic Table, and 0<a≤2, and 0<b≤2.

2. The cathode active material of claim 1, wherein a is 0.1<a≤2, and b is 0.25≤b≤2.

3. The cathode active material of claim 1, wherein M comprises at least one selected from Mg, Ca, Sr, Ba, Sc, Y, Ti, Zr, Hf, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, or Bi.

4. The cathode active material of claim 1, wherein Z comprises at least one selected from F, Cl, Br, or I.

5. The cathode active material of claim 1, wherein the cathode active material is represented by Formula 2a below:

$$Li_{2+a}MP_2O_7Z_b \quad \text{Formula 2a}$$

wherein in Formula 2a,

M is Ca, Ti, W, Mn, Tc, Re, Ru, Os, Co, Rh, Ir, Ni, Pd, Pt, Cu, Ag, Au, Hg, Tl, Si, Pb, As, Sb, or B, and is a cation having a valence of at least two, Z is at least one element selected from Group 17 of the Periodic Table, $0<a\leq 2$, and $0<b\leq 2$.

6. The cathode active material of claim 1, wherein the cathode active material is one selected from a group represented by Formulae 3a to 3h:

$Li_{2+c}CoP_2O_7Z_d$ Formula 3a $Li_{2+c}NiP_2O_7Z_d$ Formula 3b $Li_{2+c}MnP_2O_7Z_d$ Formula 3c $Li_{2+c}FeP_2O_7Z_d$ Formula 3d $Li_{2+c}CuP_2O_7Z_d$ Formula 3e $Li_{2+c}ZnP_2O_7Z_d$ Formula 3f $Li_{2+c}TiP_2O_7Z_d$ Formula 3g $Li_{2+c}CrP_2O_7Z_d$ Formula 3h wherein in each of Formulas 3a to 3h, Z is independently at least one element selected from Group 17 of the Periodic Table, c is independently $0.01\leq c\leq 2$, and d is independently $0.01\leq d\leq 2$.

7. The cathode active material of claim 1, wherein the cathode active material is one selected from a group represented by Formulae 4a to 4h:

$Li_{2+e}MP_2O_7F_f$ Formula 4a $Li_{2+e}MP_2O_7Cl_f$ Formula 4b $Li_{2+e}MP_2O_7Br_f$ Formula 4c $Li_{2+e}MP_2O_7I_f$ Formula 4d wherein in each of Formulas 4a to 4h, M is at least one metal element selected from Mg, Ca, Sr, Ba, Sc, Y, Ti, Zr, Hf, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, Se, Te, or Po, and is a cation having a valence of at least two, e is $0.1<e\leq 2$, and f is $0.25\leq f\leq 2$.

8. The cathode active material of claim 1, wherein the cathode active material is one selected from a group represented by Formulae 5a to 5h:

$Li_{2+e}CoP_2O_7F_f$ Formula 5a $Li_{2+e}NiP_2O_7F_f$ Formula 5b $Li_{2+e}MnP_2O_7F_f$ Formula 5c $Li_{2+e}FeP_2O_7F_f$ Formula 5d $Li_{2+e}CiP_2O_7F_f$ Formula 5e $Li_{2+e}ZnP_2O_7F_f$ Formula 5f $Li_{2+e}TiP_2O_7F_f$ Formula 5g $Li_{2+e}CrP_2O_7F_f$ Formula 5h wherein in each of Formulas 5a to 5h, e is independently $0.05\leq e\leq 2$, and f is independently $0.05\leq f\leq 2$.

9. The cathode active material of claim 8, wherein e is $0.25\leq e\leq 1$, and f is $0.25\leq f\leq 1$.

10. The cathode active material of claim 1, wherein the cathode active material is represented by:

$Li_{2+a}(M1_{1-z}M2_z)P_2O_7(Z1_{1-w}Z2_w)_b$

M1 and M2 are selected from Co, Ni, Mn, Fe, Cu, Zn, Ti, or Cr, M1 and M2 are each independently a cation having a valence of at least two, and M1 and M2 are different, Z1 and Z2 are F, Cl, Br, or I, and Z1 is different from Z2, and $0<z<1$, and $0<w<1$.

11. The cathode active material of claim 1, wherein the cathode active material has a ratio of a first peak at a diffraction angle 2θ of 20.5°±1.0° to a second peak at a diffraction angle 2θ of 29.0°±1.0°, of greater than 1, when analyzed by X-ray diffraction using CuKα radiation.

12. The cathode active material of claim 1, wherein the cathode active material comprises a crystal phase having a monoclinic crystal structure, and the crystal phase belongs to a $P2_1/c$ space group.

13. The cathode active material of claim 1, further comprising a crystal phase including at least one compounds represented by Formulae 7a to 7d:

$Li_{2-p}MP_2O_7$ Formula 7a $LiM_{1+q}P_2O_7$ Formula 7b $Li_{2+r}P_2O_7$ Formula 7c $LiMPO_4$ Formula 7d wherein in each of Formulas 7a to 7d, M is independently at least one metal element selected from Groups 2 to 4, or 6 to 16 of the Periodic Table, p is independently $0<p\leq 1$, q is independently $0<q\leq 1$, and r is independently $0<r\leq 2$.

14. The cathode active material of claim 1, wherein specific capacity of the cathode active material is 50 mAh/g or more.

15. The cathode active material of claim 1, wherein an average discharge voltage of the cathode active material is 4 V or more.

16. The cathode active material of claim 1, further comprising a carbon-containing coating layer arranged on a surface of the cathode active material.

17. The cathode active material of claim 16, wherein the cathode active material comprising the carbon-containing coating layer is represented by:

$(1-s)Li_{2+a}MP_2O_7Z_b\text{-}sC$, wherein,

Z is F, Cl, or Br, and $0<s\leq 0.2$.

18. The cathode active material of claim 1, wherein the cathode active material comprises first particles, and an average diameter of the first particles of the cathode active material is 500 nm to 1,000 nm.

19. A cathode comprising a cathode active material according to claim 1.

20. A lithium battery comprising:

a cathode of claim 19;

an anode; and an electrolyte arranged between the cathode and the anode.

21. A method of preparing a cathode active material, comprising:

preparing a first composition by mixing an element lithium precursor, an element Z precursor, an element M precursor, and a phosphorus precursor in a stoichiometric ratio to obtain a composition of Formula 2; and heat-treating the first composition in an oxidizing or an inert atmosphere at 400° C. to 1,000° C. for 3 to 20 hours, $$Li_{2+a}MP_2O_7Z_b \qquad \text{Formula 2}$$

wherein in Formula 2,

M is at least one metal element selected from Groups 2 to 4, or 6 to 16 of the Periodic Table, and is a cation having a valence of at least two, Z is at least one element selected from Group 18 of the Periodic Table, and $0<a\leq 2$, and $0<b\leq 2$.

* * * * *